(12) United States Patent
Breen

(10) Patent No.: US 7,525,279 B2
(45) Date of Patent: Apr. 28, 2009

(54) SYSTEM AND METHOD FOR MINIMIZING THE CHARGE TIME OF A BATTERY

(75) Inventor: Thomas B. Breen, Broomall, PA (US)

(73) Assignee: General Electric Company, Schenectady, NY (US)

( * ) Notice: Subject to any disclaimer, the term of this patent is extended or adjusted under 35 U.S.C. 154(b) by 228 days.

(21) Appl. No.: 10/892,640

(22) Filed: Jul. 16, 2004

(65) Prior Publication Data
US 2006/0012347 A1    Jan. 19, 2006

(51) Int. Cl.
*H02J 7/00* (2006.01)
(52) U.S. Cl. .................. 320/104; 903/903; 903/947
(58) Field of Classification Search .................. 320/103, 320/104, 159; 903/903, 907, 940, 947
See application file for complete search history.

(56) References Cited

U.S. PATENT DOCUMENTS

| 6,208,931 | B1 | 3/2001 | Schoettle et al. | |
| 6,362,602 | B1 | 3/2002 | Kozarekar | |
| 6,404,163 | B1 | 6/2002 | Kapsokavathis et al. | |
| 6,456,948 | B1 | 9/2002 | Lim | |
| 6,549,840 | B1 * | 4/2003 | Mikami et al. | 701/69 |
| 6,638,653 | B2 * | 10/2003 | Andou et al. | 429/20 |
| 6,700,353 | B2 | 3/2004 | Asada | |
| 2003/0210014 | A1 | 11/2003 | Jabaji et al. | |
| 2004/0065489 | A1 * | 4/2004 | Aberle et al. | 180/65.1 |
| 2004/0160123 | A1 * | 8/2004 | Burdick et al. | 307/10.1 |

FOREIGN PATENT DOCUMENTS

| EP | 1 056 623 B1 | 2/1999 |
| WO | WO 99/42331 | 8/1999 |

* cited by examiner

*Primary Examiner*—Akm Enayet Ullah
*Assistant Examiner*—Aaron Piggush
(74) *Attorney, Agent, or Firm*—Drinker Biddle & Reath LLP

(57) ABSTRACT

A system and method are disclosed for charging a battery in the least possible time in the presence of competing energy demands. A single source of energy is used to charge a battery and also to provide energy to one or more devices. Circuitry insures that the maximum possible amount of energy is being delivered to the battery at all times, consistent with the energy demands of the other devices.

19 Claims, 1 Drawing Sheet

SYSTEM AND METHOD FOR MINIMIZING THE CHARGE TIME OF A BATTERY

FIELD OF THE INVENTION

The invention is in the field of battery chargers. More specifically it addresses systems and methods for optimizing the charging of batteries in the presence of other devices competing for the energy from a source.

BACKGROUND OF THE INVENTION

With the proliferation of electrical and electronic devices now found on moving vehicles, the distribution of electrical energy to these devices must be carefully considered. It is common for some such electronic devices to be operated by auxiliary rechargeable batteries. These auxiliary batteries may be charged from the alternator of the engine while the engine is running and then continue to power various devices when the engine is not running. Often it is imperative that the batteries be fully charged when the engine is shut down, in order that the devices continue to operate for the longest possible time with the engine off.

The alternator may supply the electrical energy for many devices and batteries at the same time. If the energy demands of the various devices vary widely in time, the use of the energy from the alternator may not be optimized, unless some type of actively controlled, variable energy distribution is used.

An example of this non-optimized use, not to be construed as limiting the scope of the invention, is the charging of an auxiliary battery from the pin 7, or ACC pin, of the interface connector, or "7-way connector", commonly used in tractor-trailer vehicles. The voltage and current derivable from this pin may be used to power the antilock braking system (ABS) on tractor-trailers. This voltage and current are also an attractive source of energy for charging an auxiliary battery, which must be kept fully charged as long as possible and rapidly recharged when depleted, in order to provide reliable backup power for devices. However, SAE Standard J2247 (Society of Automotive Engineers) specifies a minimum voltage at PIN 7 in order to insure sufficient energy supply for the safe and proper operation of the ABS at all times. As a result, the battery charging current available from PIN 7 is limited to a relatively low value and the charging proceeds relatively slowly. On the other hand, the maximum energy requirements of the ABS occur only when the brakes are actually being applied, a relatively rare event. Most of the time, the ABS is not in operation, and its energy requirement is much less than that during operation. It follows that while the ABS is not in use, more energy can be directed to charging the auxiliary battery. The use of a fixed low energy flow to the battery, therefore, as is currently the practice, is not optimal.

To further illustrate this, in one particular use, it has been demonstrated that compliance with SAE Standard J2247 effectively requires the charging current to be limited to 1.25 Amps at all times, in order to cover worst-case operating conditions. At this current it takes 12 hours to fully recharge a particular battery pack. With optimized use of the alternator energy, however, this time can be reduced to 15 minutes.

There is thus a need for a system and method which will charge a battery from an energy source in the least amount of time without adversely affecting the operation of other devices also drawing energy from this source. Previous inventions do not appear to meet this need. PCT application publication WO 99/42331 discloses a device for supplying electrical energy to devices on a vehicle in the event of failure or discharge of auxiliary batteries. The monitoring method employed is distinct from that of the subject invention. U.S. Publication 2003/0210014 discloses a specialized voltage regulator that sits between the alternator and a battery. U.S. Pat. No. 6,700,353 discloses a voltage regulator for the main charging system. Neither of these addresses the problems addressed by the subject invention.

BRIEF DESCRIPTION OF THE INVENTION

Electrical energy from a source is used to charge a battery and also to power at least one device. Sensing circuitry monitors the varying energy demands of the devices and generates, in response to those varying demands, a control signal. The control signal is fed to a regulator, which responds by varying the relative amounts of energy fed to the battery and to the devices. In some situations, delays may be introduced between the arrival of the control signal at the regulator and the responding of the regulator, in order to avoid unwanted oscillations or other undesirable behavior.

The entire system is designed to convey the largest possible amount of charging energy to the battery at all times, consistent with the energy demands of the devices.

DETAILED DESCRIPTION OF THE INVENTION

Figure 1:
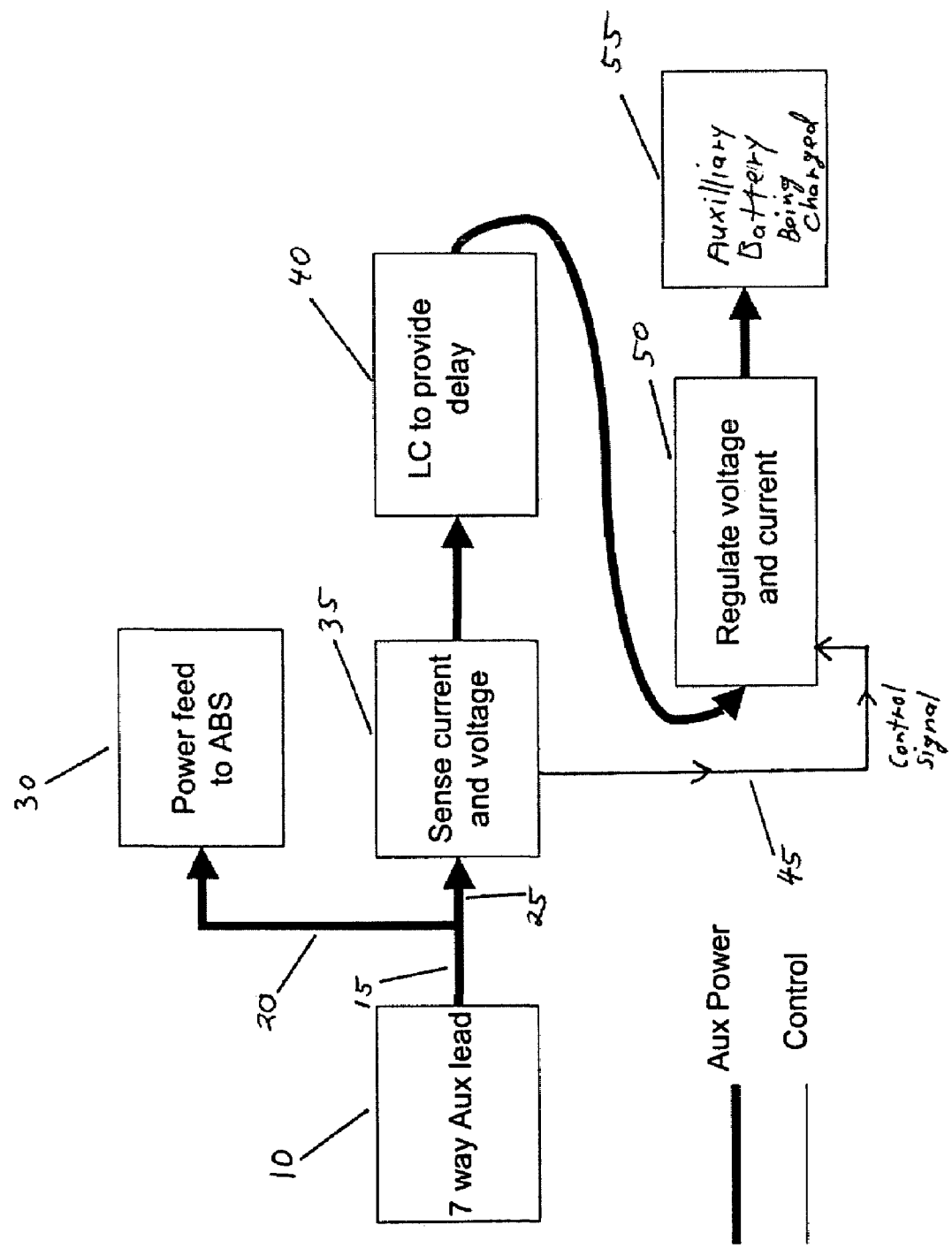
FIG. 1 is a block diagram of the battery charging system, showing the various components, their interconnections, energy flow, and signal paths.

FIG. 1 depicts an embodiment of the invention, not to be construed as limiting. Pin 7 (the ACCESSORY or ACC pin) of a seven-way connector 10 for a tractor-trailer combination, is a source of electrical energy 15, which must be operated in accordance with SAE J2247. The energy may be provided by the alternator of the tractor. A first portion 25 of the energy is used to charge an auxiliary battery 55. A second portion 20 of this energy is used to operate the anti-lock braking system (ABS) 30 of the tractor-trailer.

The ABS has a varying demand for energy, requiring more energy when it is activated than when not activated. The variations in current and voltage resulting from this variation in energy demand are sensed by sensing circuitry 35. The sensing circuitry 35 generates a control signal 45 based on the variations in energy demand by the ABS and this signal is fed to a regulator 50. The regulator varies the magnitudes of the first and second energy portions such that the ABS always obtains enough energy to operate safely and properly, slowing or halting the tractor-trailer without skidding.

Specifically, in this embodiment, the total voltage supplied to the ABS 30 would be maintained by the regulator 50 above the minimum required to comply with SAE J2247. Most of the time, the ABS system is not in operation, and the battery is charged with the maximum current that can be drawn from the source 15 without the ABS voltage dropping below this minimum. At this current level, the battery 55 may be fully charged in as little as 15 minutes, compared to about 12 hours if the current is always limited to the relatively low values used in current practice. Once charged, the battery 55 can provide auxiliary or backup power to one or more devices on board, such as a Global Positioning System (GPS) locator system.

Activation of the ABS 30 may be sensed 35 by a drop in the voltage supplied to it, or, alternatively by detecting the activation of a brake light. Once the ABS activation is sensed the regulator 50, activated by the control signal 45, immediately decreases the energy supplied to the battery 55, so as to maintain sufficient energy supply to the ABS 30. Once the ABS 30 is no longer activated, it may be desirable that the battery-charging energy portion 25 not return immediately to its previous level but allow the supply portion 20 to be maintained for the ABS system for a for some time to avoid undesirable pumping or oscillation of the brakes. This may be accomplished with delay circuitry 40, which introduces a delay in the response of the regulator 50. In one embodiment, the delay may be introduced only when the energy demand of the ABS is decreasing over time. This decrease could be sensed as an indication that the brakes have been released and the ABS is transitioning from being activated to being not activated. In one embodiment, the delay time is introduced using an inductor-capacitor (LC) circuit, such as a delay line.

It is to be understood that the descriptions and embodiments described above are exemplary, and are not to be taken as limiting the scope of the invention. Alternatives, modifications, and variations, which do not depart from the spirit and scope of this invention, will be apparent to those skilled in the art. The scope of this invention is to be defined by the following claims:

What is claimed is:

1. A system for charging a battery, comprising
a source of electrical energy, wherein a first portion of said energy is used to charge a battery, and a second portion of energy is provided to a device, said device having varying demands for energy, and
circuitry for sensing activation of said device and generating, in response to said activation, a control signal, said control signal being fed to a regulator, said regulator responding to said control signal by reducing said first portion and increasing said second portion so as to satisfy said demand of said device; wherein
said device is an anti-lock brake system operating on the brakes of a vehicle.

2. The system of claim 1, wherein said cicuitry senses activation of said device by a drop in voltage supplied to said device.

3. The system of claim 1, wherein said source comprises the ACC pin of a 7-way connector on a tractor-trailer.

4. The system of claim 1, wherein said circuitry senses activation of said device by activation of one or more brake lights.

5. The system of claim 1, wherein said circuitry further senses deactivation of said device and generates, in response to said deactivation, a control signal being fed to a regulator, said regulator responding to said control signal by increasing said first portion and reducing said second portion so as to direct maximum possible energy flow to said battery.

6. The system of claim 5, additionally comprising circuitry which introduces a delay between the arrival of said control signal at said regulator and said responding of said regulator.

7. The system of claim 6, wherein said circuitry which introduces a delay comprises an LC circuit.

8. The system of claim 6, wherein said delay is introduced only when said demand for energy is decreasing over time.

9. The system of claim 5, wherein said circuitry senses deactivation of said device by an increase in voltage supplied to said device.

10. The system of claim 5, wherein said circuitry senses deactivation of said device by deactivation of one or more brake lights.

11. A method for charging a battery, comprising:
providing a source of electrical energy, wherein a first portion of said energy is used to charge a battery, and a second portion of said energy is provided to a device, said device having varying demands for energy, and
sensing activation of said device and generating, in response to said activation, a control signal, said control signal being fed to a regulator, said regulator responding to said control signal by reducing said first portion and increasing said second portion so as to satisfy said demand of said device; wherein
said device is an anti-lock brake system operating on the brakes of a vehicle.

12. The method of claim 11, wherein said activation is sensed by a drop in voltage supplied to said device.

13. The method of claim 11, wherein said source is the ACC pin of a 7-way connector on a tractor-trailer.

14. The system of claim 11, wherein said activation is sensed by activation of one or more brake lights.

15. The system of claim 11, further comprising:
sensing deactivation of said device and generating, in response to said deactivation, a control signal being fed to a regulator, said regulator responding to said control signal by increasing said first portion and reducing said second portion so as to direct maximum possible energy flow to said battery.

16. The system of claim 15, wherein said circuitry senses deactivation of said device by an increase in voltage supplied to said device.

17. The system of claim 15, wherein said circuitry senses deactivation of said device by deactivation of one or more brake lights.

18. The method of claim 15, additionally comprising introducing a delay between the arrival of said control signal at said regulator and said responding of said regulator.

19. The method of claim 18, wherein said delay is introduced only when said demand for energy is decreasing over time.

* * * * *